(12) United States Patent
Hannig

(10) Patent No.: US 9,145,681 B2
(45) Date of Patent: Sep. 29, 2015

(54) PANEL HAVING A BEVEL

(71) Applicant: AKZENTA PANEELE + PROFILE GMBH, Kaisersesch (DE)

(72) Inventor: Hans-Jürgen Hannig, Bergisch Gladbach (DE)

(73) Assignee: Akzenta Paneele + Profile GMBH (DE)

( * ) Notice: Subject to any disclaimer, the term of this patent is extended or adjusted under 35 U.S.C. 154(b) by 0 days.

(21) Appl. No.: 14/347,794

(22) PCT Filed: Nov. 14, 2012

(86) PCT No.: PCT/EP2012/072582
§ 371 (c)(1),
(2) Date: Mar. 27, 2014

(87) PCT Pub. No.: WO2013/072349
PCT Pub. Date: May 23, 2013

(65) Prior Publication Data
US 2014/0237925 A1 Aug. 28, 2014

(30) Foreign Application Priority Data

Nov. 15, 2011 (DE) .................. 20 2011 107 844 U

(51) Int. Cl.
*E04C 2/24* (2006.01)
*E04C 2/38* (2006.01)
(Continued)

(52) U.S. Cl.
CPC . *E04C 2/388* (2013.01); *C09J 5/00* (2013.01); *E04C 2/20* (2013.01); *E04C 2/24* (2013.01); *E04F 15/02033* (2013.01);
(Continued)

(58) Field of Classification Search
CPC ............. E04C 2/388; E04C 2/20; E04C 2/24; E04F 15/02033; E04F 15/105; E04F 15/107; E04F 13/077; C09J 5/00; Y10T 428/24777; Y10T 428/24793
USPC .................. 52/309.1, 309.14, 309.15, 741.4; 428/48, 60, 43, 68, 199, 159, 319.9
See application file for complete search history.

(56) References Cited

U.S. PATENT DOCUMENTS 2,209,247 A * 7/1940 Diklilian .................... 156/304.4
3,198,686 A * 8/1965 Caligari, Jr. .................. 428/196
(Continued)

FOREIGN PATENT DOCUMENTS

DE 1719095 A1 7/1971
DE 156468 A3 9/1982
(Continued)

OTHER PUBLICATIONS

International Search Report, PCT/2012/072582, dated Aug. 6, 2013, 3 pages.
(Continued)

*Primary Examiner* — Brent W Herring
(74) *Attorney, Agent, or Firm* — Senniger Powers LLP

(57) ABSTRACT

The invention relates to a panel for covering floors, walls, ceilings and the like having a carrier layer and optionally at least one cover layer made of a plastic such as acrylic resin, PVC, PU, PC PP, PPE, PMMA, et cetera. According to the invention, a panel is designed as a floor, ceiling or wall covering having a bevel applied to at least one panel edge, wherein the region of the bevel is coated by a material which comprises components which cause a swelling of the plastic and/or can dissolve the plastic.

20 Claims, 1 Drawing Sheet

(51) Int. Cl.
*C09J 5/00* (2006.01)
*E04F 15/02* (2006.01)
*E04F 15/10* (2006.01)
*E04C 2/20* (2006.01)
*E04F 13/077* (2006.01)

(52) U.S. Cl.
CPC ............ *E04F 15/105* (2013.01); *E04F 15/107* (2013.01); *E04F 13/077* (2013.01); *E04F 15/02038* (2013.01)

(56) References Cited

U.S. PATENT DOCUMENTS

| | | | |
|---|---|---|---|
| 3,204,380 A * | 9/1965 | Wilson et al. | 52/309.15 |
| 3,531,367 A * | 9/1970 | Karsten | 428/317.7 |
| 5,880,167 A | 3/1999 | Krebs et al. | |
| 6,536,178 B1 * | 3/2003 | Pålsson et al. | 52/589.1 |
| 6,617,009 B1 * | 9/2003 | Chen et al. | 428/195.1 |
| 6,675,545 B2 * | 1/2004 | Chen et al. | 52/586.1 |
| 6,761,008 B2 * | 7/2004 | Chen et al. | 52/586.1 |
| 6,770,706 B2 | 8/2004 | Lewin et al. | |
| 7,506,481 B2 * | 3/2009 | Grafenauer | 52/592.1 |
| 7,779,964 B2 * | 8/2010 | Birch et al. | 181/284 |
| 7,918,062 B2 * | 4/2011 | Chen | 52/311.1 |
| 8,365,488 B2 * | 2/2013 | Chen | 52/311.1 |
| 8,584,423 B2 * | 11/2013 | Pervan et al. | 52/588.1 |
| 2005/0235593 A1 * | 10/2005 | Hecht | 52/592.1 |
| 2006/0130416 A1 | 6/2006 | Mohr et al. | |
| 2008/0295438 A1 * | 12/2008 | Knauseder | 52/589.1 |
| 2011/0138722 A1 | 6/2011 | Hannig | |

FOREIGN PATENT DOCUMENTS

| | | |
|---|---|---|
| DE | 202005011120 U1 | 9/2005 |
| DE | 102005044462 A1 | 3/2007 |
| EP | 1382774 A1 | 1/2004 |
| EP | 1512809 A1 | 3/2005 |
| JP | 2001193267 A | 7/2001 |
| JP | 2006-123512 A | 5/2006 |
| JP | 2008-238726 A | 10/2008 |
| WO | 0153067 A2 | 7/2001 |
| WO | 0196688 A1 | 12/2001 |
| WO | 2007113672 A1 | 10/2007 |
| WO | 2008078181 A1 | 7/2008 |

OTHER PUBLICATIONS

Abstract of EP1382774; Jan. 21, 2004.
Abstract of DE202005011120; Sep. 22, 2005.
Abstract of DD156468; Sep. 1, 1982.
International Preliminary Report on Patentability, PCT/EP2012/072582, dated May 20, 2014, 10 pages.
English Abstract JP 2006-123512 A.
English Abstract of JP 2008-238726 A.

* cited by examiner

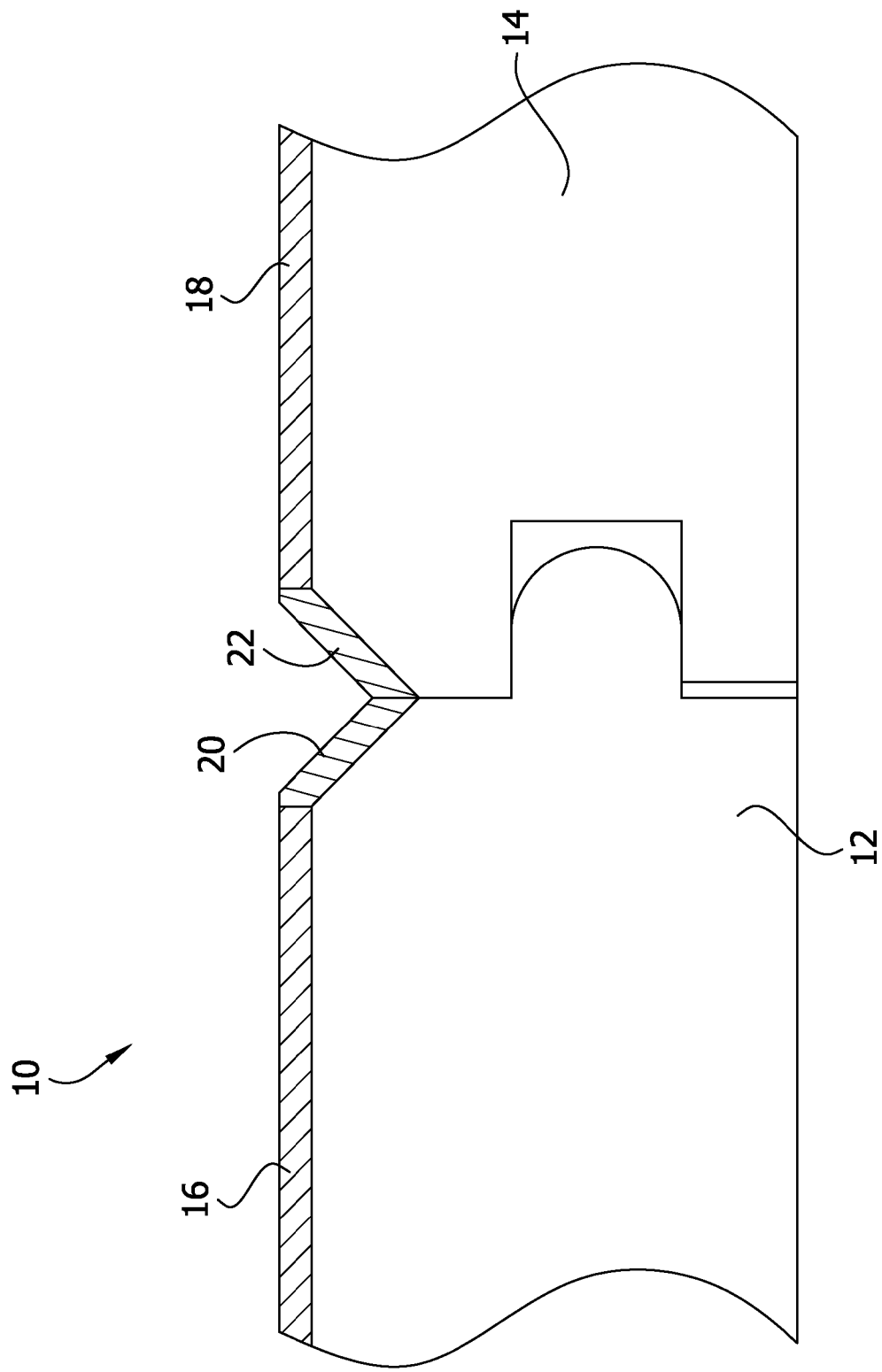

PANEL HAVING A BEVEL

REFERENCE TO RELATED APPLICATIONS

This application is a U.S. national stage application of International Patent Application No. PCT/EP2012/072582, filed Nov. 14, 2012, and claims the benefit of German Application No. 202011107844.6, filed Nov. 15, 2011, the entire disclosures of which are incorporated herein by reference.

FIELD OF THE INVENTION

The invention relates to a panel for covering floors, walls, ceilings and the like having a carrier layer and optionally at least one cover layer made of a plastic material such as acrylic resin, PVC, PU, PC PP, PPE, PMMA, etc.

BACKGROUND OF THE INVENTION

Such panels are generally known. For example, EP 1634696 B1 describes a floor cover element comprising a carrier plate made of a pressure-resistant wood material and a cover layer made of foamed polyvinyl chloride which includes a foamed core arranged between vinyl layers.

The formation of a chamfer on at least two opposite sides of a panel is known from WO 01/96688 A1 for decorative panels comprising a wood material core. Here the chamfer is used to prevent damages to the decorative layer during the installation, if the edges contact each other with pressure when the panels are pivoted. In order to conceal the interruption of the decorative layer, the region of this bevel is printed.

In EP 1512809 A1 it is claimed to provide a moisture-resistant coating on the walls of the recess or bevel. This is in order to prevent the harmful penetration of moisture into the material of the carrier made of wood material. The coating may be formed from a varnish, a paint or a flexible and elastic material and may be applied in such a thickness that in connecting two panels by squeezing the coating the joint is sealed.

German utility model DE 202008011589 U1 discloses a panel made from a pliable and flexible plastic material as a carrier with a decorative layer and with complementary locking means which enable the production of a contiguous surface area. In order to conceal the inevitably different gaps between the individual panels and to improve the aesthetic appeal, a chamfer or bevel is provided on at least one panel edge.

EP 1382774 A1 describes a panel made of a wood material and a decorative layer comprising a decorative paper or veneer. Herein, a chamfer is provided, which is intended to achieve the appearance of a traditional parquet and may be provided with an additional coating of a varnish or an adhesive tape.

In applying the known technique of the bevel to panels comprising a carrier and/or cover layer made of plastic, however, difficulties arise. Particularly if the carrier has a certain degree of flexibility, or if the cover layer is pliable, which is advantageous both during the installation and in use—the coating of the recess can easily be released, because it consists only of a narrow strip and is required to adhere both at the cover layer and at the carrier layer, when the chamfer or recess extends up to it. This danger particularly exists when the coatings of adjacent panels are pressed together during the assembly. Conventional varnishes exhibit insufficient adhesion at plastic surfaces.

SUMMARY OF THE INVENTION

It is therefore an object of the invention to provide a panel comprising a cover layer made of plastic in which the coating of the edge recess can not be released during the installation and even after prolonged use. Moreover, it is an object of the invention to provide a method for producing a corresponding panel.

This object is achieved with respect to the panel by a panel according to the main claim.

BRIEF DESCRIPTION OF THE FIGURE

FIG. 1 is a schematic representation of a panel having a bevel.

DETAILED DESCRIPTION OF PREFERRED EMBODIMENTS

The panels according to the invention can consist of only a single plastic layer. In particular thermoplastics, such as acrylic resins, polymethyl methacrylate, polyvinyl chloride (PVC), polyurethanes (PU), polycarbonate (PC), polypropylene (PP), polyphenylene ether (PPE), polyamide (PA), polystyrene (PS) and copolymers of monomers underlying these and mixtures thereof come into consideration as plastic materials. In addition, a terpolymer such as acrylonitrile-butadiene-styrene copolymerizate (ABS) may be used as a plastic material.

Panels according to the invention such as shown at 10 in FIG. 1 preferably comprise at least one carrier layer 12, 14 and a covering layer 16, 20, 22, 18 made of a plastic material on at least one side of the carrier layer 12, 14 of the panel 10.

It has surprisingly been found that by means of components which promote the adhesion of the coating to the plastic material of the cover layer in the region of the bevel it is possible, too, to improve the adhesion of the further layers affected by the bevel to such an extent that the aforementioned problems no longer occur.

The bevel can be, for example, a chamfer (slant) as shown at 20, 22 in FIG. 1, a rounding or a step-shaped fold. Its width depends inter alia on the thickness of the panel and is preferably between 0.5 and 5 mm.

The carrier layer of the panel according to the invention can be constructed of various materials, including wood-based materials such as HDF, OSB and MDF boards, particle boards and also plastic materials such as thermoplastics or uncrosslinked or crosslinked elastomers and duromers or mixtures of such polymers. These, in addition to polyvinyl chloride can also be polyolefins (for example polyethylene, polypropylene), polyamides, polyurethanes and polystyrene. Also useful are paper, cardboard as well as plates of minerals such as natural and artificial stone slabs, concrete slabs, gypsum fiber boards, so-called WPC plates (made from a mixture of plastic and wood) as well as plates made from natural raw materials such as cork and wood. Moreover, plates from biomass such as straw, maize straw, bamboo, leaves, algae extracts, hemp, oil palm fiber can be used. Furthermore, recycling materials of said materials are useful. The carrier layer may also comprise a plurality of the above mentioned materials in a mixture or as a laminate. Examples are plasterboard or wood-plastic laminate boards.

The plate carrier material may—depending on the desired physical properties of the finished panel—be massive dense or can comprise more or less large cavities, for example, may be foamed or may comprise cavities having a size in the order of the plate dimensions.

Plastic materials for the cover layer are preferably thermoplastic materials such as polyvinyl chloride, polyolefins (for example polyethylene, polypropylene), polyamides, polyurethanes and polystyrene. These layers can be laminated as a preformed film onto the carrier layer or may, for example, be produced in situ from a molten material or a solution. The lamination may be conducted by means of an adhesive, which is to be selected with regard to the materials to be bonded. The adhesives used according to the invention are preferably physically and chemically setting adhesives, in particular on the basis of polyurethanes. Reactive hot melt adhesives are also suitable. These are preferably applied onto the surface of the carrier or onto a surface of the cover layer in the molten state at temperatures of, for example, 110 to 200° C., preferably up to 130° C. Immediately after the application process the cover layer is placed on the surface of the carrier, wherein the bonding of the nonwoven fabric with the carrier is effected by cooling and solidification of the hot melt adhesive. Suitable hot melt adhesives include polyurethanes. Such reactive hot melt adhesives are described, for example, in EP 777695 B2. Basically also reactive adhesives comprising two components or even simple hot melt adhesives (hotmelts) can be used. Furthermore, cold-setting one-component adhesives and dispersion adhesives (white glue) can be used.

It is also possible to make the free surface of the cover layer highly resistant against wear before or after bonding to the carrier layer, for example, by electron beam crosslinking. Suitable electron beam-cured films are commercially available as so-called ESH films. The cover layer may also contain abrasion-resistant additives such as corundum, boron carbide or the like.

The plastic materials of the cover layer may contain conventional fillers, such as calcium carbonate (chalk), alumina, silica gel, quartz powder, wood flour, gypsum. Moreover, they can be coloured in a known manner. As a material for the cover layer recycled plastic materials, especially thermoplastics, can be used, too. Both the carrier layer and the cover layer can be stabilized by insertions of fibers, for example of glass, aramid, or other high-strength plastics and carbon.

The cover layer may also comprise gas bubbles which may constitute, for example, 10 to 50% of the total volume of the layer and can be produced in a known manner by addition of a blowing agent during the production of the layer.

The thickness of the cover layer is generally between 0.1 and 10 mm. Preferred is a range of 0.1 to 5 mm, particularly preferably from 0.2 to 2 mm.

In particular, but not exclusively, the coating layer can, if it is laminated as a preformed film onto the carrier layer, be used in the form of a multilayer composite.

The cover layer of the panel according to the invention may, for example, be decorated by specially coloring or patterning, such as by printing, before it is bonded to the carrier layer. When the printed pattern is applied to the carrier layer, it is protected against abrasion by the film. In this case, the covering layer has to be transparent. Furthermore, a relief can be imprinted into the surface of the cover layer, which can be spatially related to a possibly existing decor, for example, to emulate a natural material such as wood or stone. The imprinting process can be carried out in known manner by rollers or pressing plates. It is also possible to provide the decor within a first cover layer and the imprint, optionally including a wear protection, within an overlying second cover layer.

It is also possible to provide the coating with an imprint in the region of the bevel, especially of the chamfer or rounding. This can be done in a separate step or together with the imprint of the surface layer.

The region of the bevel, especially the chamfer or rounding, can be provided with a decorative pattern, preferably be printed, prior to the application of the coating material. In this case the coating agent is suitably transparent. Such a coating, too, can be provided with an imprint, which in turn can be in register with the decor of the bevel.

In addition to the carrier layer and optionally the cover layer the panel according to the invention may comprise further layers, such as a particular wear-resistant outer layer, a decorative layer, a back layer.

The coating material present in the panel according to the invention comprises adhesion-promoting components. Preferably, these are materials that cause a swelling of the plastic material. Moreover, materials can be used which are solvents for the plastic material, if the concentration thereof is set to be sufficiently low. Then no dissolution but only a swelling of the uppermost regions in the area of the bevel occurs. For example, for the cover layer material polyvinyl chloride, aromatic hydrocarbons such as toluene or xylene, aliphatic halogenated hydrocarbons such as trichloroethane, aromatic or aliphatic heterocyclic compounds including nitrogen and/or oxygen as a heteroatom, in particular cyclic ethers such as dioxane, tetrahydrofuran, morpholine, pyridine, pyrimidine, piperidine, sulfolane, aliphatic esters such as butyl acetate, acetone, dimethyl sulfoxide (DMSO) and glycols such as ethylene glycol, diethylene glycol, triethylene glycol, diethylene glykol monomethyl ester, ethylene glycol monobutyl ether or 1,2-propanediol. One can assume that the adhesion-promoting effect is based on a partial welding of the swollen plastic material with the polymer film formed from the binder of the coating material and/or an enlarged adhesion surface area caused by partially dissolving or swelling of the plastic material.

In one embodiment of the invention, the solvent or swelling agent content of the coating material at the time of the application onto the carrier layer can be in a range between $\geq 1$ wt.-% to $\leq 15$ wt.-%, preferably between $\geq 2$ wt.-% to $\leq 10$ wt.-%, particularly preferably between $\geq 4$ wt.-% to $\leq 8$ wt.-%, especially between $\geq 5$ wt.-% to $\leq 7$ wt.-%.

The effect of the adhesion-promoting and swelling causing components can be enhanced by wetting agents. In this case, the coating material is preferably free of alkylphenol ethoxylate (APEO).

The coating material may include a natural or synthetic high molecular weight binder and a suitable solvent therefor. However, preferred coating materials are those, in which polymeric binders are dispersed in an aqueous phase. Such coating materials are generally known and in addition include further additives, such as wetting agents, pigments, dyes, fillers. Herein, the particles of the polymer dispersion preferably have a size in the range of 10 to 1000 nm and form a film after the evaporation of the dispersion medium (water) by coalescence. The adherence- or swelling-promoting component in this case must have a sufficient miscibility with the aqueous phase of the coating material.

Particularly preferred as binder for the coating materials according to the invention are copolymers of acrylic acid esters, in particular methyl acrylate, ethyl acrylate and methyl methacrylate, and styrene. It has been found that such a copolymer is particularly resistant to solvents and to stress corrosion cracking.

The color of the coating material can be matched to the color of the plastic or cover layer surface or the optionally decor by addition of colorants. Moreover, coating materials can be used that are transparent at least after the film formation.

A suitable coating material is manufactured by Heidelberger Lackfabrik Rentzsch GmbH & Co. KG under the trade name "Farblacksystem HD-Aquafix Fasenlack Color Art. Nr. 7331".

It is particularly advantageous to add dirt-repellent additives to the coating material. Since the areas of the recesses are countersunk at the contact lines of two respective panels in the installed state, they are treated with less intensity during mechanical cleaning of the surface covered with the panels, such that they are liable for accumulating dirt. The dirt-repellent additives can include particles of hydrophobic materials such as fluorinated polymer (for example, tetrafluoropolyethylene), waxes, such as polyethylene wax, polypropylene wax, amide wax, carnauba wax, paraffin and hydrophobized silica gels. The size of such particles is advantageously in the range of 10 nm to 10 μm. Since the addition of such hydrophobic particles can adversely affect the adhesion of the coating to the plastic carrier and/or the decorative layer in an undesired manner, it is advantageous and sufficient first to apply at least one layer of a coating material without hydrophobic particles and then only to add the latter to a last applied layer, such as to make only this outer layer dirt-repellent.

Adapted to the particular application the plastic materials of the cover layer can include more or less plasticizers, for example, phthalic acid esters of higher alcohols such as dioctyl phthalate. The amount of the adherence- or swelling-promoting additive within the coating material can be determined according to amount of the plasticizer in the plastic material of the cover layer, wherein typically a higher amount of plasticizer requires less additives.

The application of the coating material onto the region of the bevel, that is, the chamfer, where applicable, is advantageously carried out by means of specially adapted methods, by which it is possible to coat the narrow, elongated region of the chamfer without contamination of the decorative surface and the side faces of the panel. This may for example be a spray nozzle that is associated with a suction means which keeps coating material away from the areas outside of the bevel. It is also possible to apply the coating material by means of a roller or a transfer wheel which optionally has a textured surface that is in contact with the chamfer surface and is immersed into the coating solution at another location of its perimeter. Finally, a device is applicable as described, for example, in DE 202005011120 U1 or DD 156468 A3. Herein, the panel edge is just in contact with a drop of the coating material, which is stably formed on a coating head by continuously supplying the coating material and suction of excess material, but is not in contact with the coating head itself.

In an attempt to practice the invention a 4.1 mm thick carrier plate made of 40% polyvinyl chloride with 23% plasticizer (di-i-nonylphthalat/i-nonylbenzoat) and 24% calcium carbonate and a remainder of blowing agent and other additives was laminated with a pigmented 1.5 mm thick PVC film. From the rectangular plate panels were cut, provided with connecting elements, and chamfered at the longitudinal sides by 1 mm under 45°. The chamfer region was coated with a coating material according to the invention by a device corresponding to DE 202005011120 U1. The applied layer adhered excellently to the chamfer surface even if the panel was bent or treated with a cleaning device.

In a further example an approximately 1.7 mm thick foamed PVC film was laminated onto a carrier made of a 6.5 mm thick HDF plate and panels with a coated chamfer were produced from the composite material. Here, too, the coating of the chamfer region exhibited a very good adhesive strength.

In a third example, a PVC film (thickness 0.25 mm) crosslinked on the surface by use of electron beams was laminated onto the carrier used in the first example. Although in this case the chamfer extended into the carrier plate an excellent adhesive strength of the coating of the chamfer has been observed.

With respect to the method this object is achieved by a method according to claim 14.

Thus, a method for producing a floor, ceiling or wall covering is proposed, including the steps of: providing a carrier (see 12, 14 of FIG. 1) including at least one layer of a plastic material (16, 20, 22, 18) and complementary locking means provided at at least two panel edges (shown at the interface between 12, 14) which in the locked state of two panels co-operate and a bevel provided at at least one panel edge; coating at least the region of the bevel with a material containing components that cause a swelling of the plastic material and/or is able to dissolve the plastic material.

According to a preferred embodiment of the method the region of the bevel is coated with a material which as a swelling and/or dissolving component includes at least one compound selected from the group consisting of aromatic hydrocarbons, aliphatic halogenated hydrocarbons, heterocyclic compounds with oxygen and/or nitrogen, acetone, dimethyl sulfoxide (DMSO) glycol and glycol derivatives.

The invention claimed is:

1. Method for producing a floor, ceiling or wall covering, comprising the steps:
   providing a carrier including at least one cover layer of a plastic material and at least two panel edges which in a locked state of two panels co-operate and a bevel provided at at least one panel edge wherein the cover layer of plastic material is on the bevel;
   coating at least the region of the bevel with a coating material which comprises components selected from the group consisting of a) components that cause a swelling of the plastic material on the bevel thereby promoting adhesion between the cover layer on the bevel and the coating material and b) components that dissolve the plastic material on the bevel thereby promoting adhesion between the cover layer on the bevel and the coating material;
   wherein upper decorative surfaces and side faces of the panel are not contaminated by the coating material.

2. Method according to claim 1, wherein said components comprised in the coating material comprise at least one compound selected from the group consisting of aromatic hydrocarbons, aliphatic halogenated hydrocarbons, heterocyclic compounds including oxygen and/or nitrogen, acetone, butyl acetate, dimethyl sulfoxide (DMSO), glycol and glycol derivatives.

3. Method according to claim 1 wherein the coating material comprises the components which cause the swelling of the plastic material.

4. Method according to claim 1 wherein the coating material comprises the components which dissolve the plastic material.

5. Panel as a floor, ceiling or wall cover comprising:
   a carrier,
   at least one cover layer on the carrier comprising a plastic material,
   two panel edges which co-operate in a locked state of two panels, and
   a bevel provided at at least one panel edge, and
   a coating material;
   characterized in that the cover layer is on the bevel and said cover layer on the bevel is coated with said coating material comprising components which cause a swelling of the plastic material of the cover layer on the bevel and/or dissolve the plastic material of the cover layer on the bevel, and upper decorative surfaces and side faces of the panel are not contaminated by the coating material.

6. Panel according to claim 5, characterized in that the cover layer has a thickness between 0.2 and 2 mm.

7. Panel according to claim 5, characterized in that the carrier layer consists of a plastic material.

8. Panel according to claim 5, characterized in that the plastic material of the cover layer is a thermoplastic material.

9. Panel according to claim 8, characterized in that the thermoplastic material comprises polyvinyl chloride, a polyolefin, a polyamide, a polyurethane or polystyrene.

10. Panel according to claim 8, characterized in that the thermoplastic material is crosslinked at the surface.

11. Panel according to claim 5, characterized in that the components comprised in the coating material include heterocyclic compounds comprising oxygen and/or nitrogen.

12. Panel according to claim 5, characterized in that the components comprised in the coating material include at least one compound selected from the group consisting of aromatic hydrocarbons, aliphatic halogenated hydrocarbons, acetone, butyl acetate, dimethyl sulfoxide (DMSO), glycol, and glycol derivatives.

13. Panel according to claim 5, characterized in that the coating material comprises an aqueous polymer dispersion.

14. Panel according to claim 13, characterized in that the polymer dispersion comprises a copolymer of acrylic acid esters and styrene.

15. Panel according to claim 13, characterized in that the polymer dispersion comprises a polymer of acrylic acid, methacrylic acid, methacrylic acid methyl ester or a mixture thereof.

16. Panel according to claim 5, characterized in that the coating material has dirt-resistant properties.

17. Panel according to claim 16, characterized in that the coating material includes particles of a hydrophobic material.

18. Panel according to claim 16, characterized in that the coating in the region of the bevel has a multilayer structure and only the outermost layer has dirt-resistant properties.

19. Panel according to claim 5 wherein the coating material comprises the components which cause the swelling of the plastic material.

20. Panel according to claim 5 wherein the coating material comprises the components which dissolve the plastic material.

* * * * *